United States Patent
Grattan et al.

(10) Patent No.: US 10,836,442 B1
(45) Date of Patent: Nov. 17, 2020

(54) VEHICLE SKID PANEL

(71) Applicant: Nissan North America, Inc., Franklin, TN (US)

(72) Inventors: Patrick Grattan, Wixom, MI (US); Michael McGory, West Bloomfield, MI (US); David J Lepley, Bloomfield Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/412,064

(22) Filed: May 14, 2019

(51) Int. Cl.
 *B62D 25/20* (2006.01)
 *B62D 21/15* (2006.01)
 *B60R 13/00* (2006.01)

(52) U.S. Cl.
 CPC ........ *B62D 25/2072* (2013.01); *B60R 13/005* (2013.01); *B62D 21/155* (2013.01); *B62D 25/2018* (2013.01)

(58) Field of Classification Search
 CPC ............................... B62D 25/20; B62D 21/155
 See application file for complete search history.

(56) References Cited

U.S. PATENT DOCUMENTS

| | | |
|---|---|---|
| 5,992,926 A * | 11/1999 | Christofaro ............ B62D 21/02 296/204 |
| D476,934 S | 7/2003 | Murkett |
| D515,971 S | 2/2006 | Essig |
| D605,977 S | 12/2009 | Zipfel et al. |
| D616,797 S | 6/2010 | Lamm et al. |
| D734,230 S | 7/2015 | Wheel et al. |
| D769,163 S * | 10/2016 | Platto ........................... D12/196 |
| D800,621 S | 10/2017 | Bucher et al. |
| 9,994,163 B2 * | 6/2018 | Wheeler ................. B60R 11/06 |
| D857,575 S * | 8/2019 | Harriton ...................... D12/196 |
| D867,232 S * | 11/2019 | Izard ............................ D12/169 |

* cited by examiner

*Primary Examiner* — John D Walters
*Assistant Examiner* — James J Triggs
(74) *Attorney, Agent, or Firm* — Global IP Counselors, LLP (57) ABSTRACT

A vehicle skid panel having a main body configured for installation to a forward area of an underside of a vehicle. The main body has a lower surface and an upper surface. The lower surface includes a flat area, a plurality of first offset areas and a plurality of second offset areas. The plurality of first offset areas are offset from the flat area such that the plurality of first offset areas have respective surfaces that are vertically lower than the flat area and the plurality of second offset areas are vertically higher than the flat area.

20 Claims, 11 Drawing Sheets

VEHICLE SKID PANEL

BACKGROUND

Field of the Invention

The present invention generally relates to a vehicle skid panel. More specifically, the present invention relates to vehicle skip panel configured for attachment to a forward area of an underside of a vehicle in order to shield the engine compartment area of a vehicle from debris or objects that may become airborne and otherwise strike the underside of the vehicle.

Background Information

Skid panels (also referred to as skid plates) for the underside of a vehicle are typically flat panels that attached to structures along an underside of the vehicle. Skid panels are generally manufactured as a flat plate or panel that have little or no reinforcement(s), as skid panels are not structural elements.

SUMMARY

One object of the present disclosure is to provide a skid panel that is formed or manufactured with various surface contours and shapes that provide rigidity and hence, additional strength again bending.

Another object of the present disclosure is to provide a skid panel with a decorative appearance via the use of surface contours that strengthen and stiffen the skid panel.

In view of the state of the known technology, one aspect of the present disclosure is to provide a vehicle skid panel with a main body configured for installation to a forward area of an underside of a vehicle. The main body has a lower surface and an upper surface. The lower surface includes a flat area, a plurality of first offset areas and a plurality of second offset areas. The plurality of first offset areas are offset from the flat area such that the plurality of first offset areas have respective surfaces that are vertically lower than the flat area and the plurality of second offset areas are vertically higher than the flat area.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
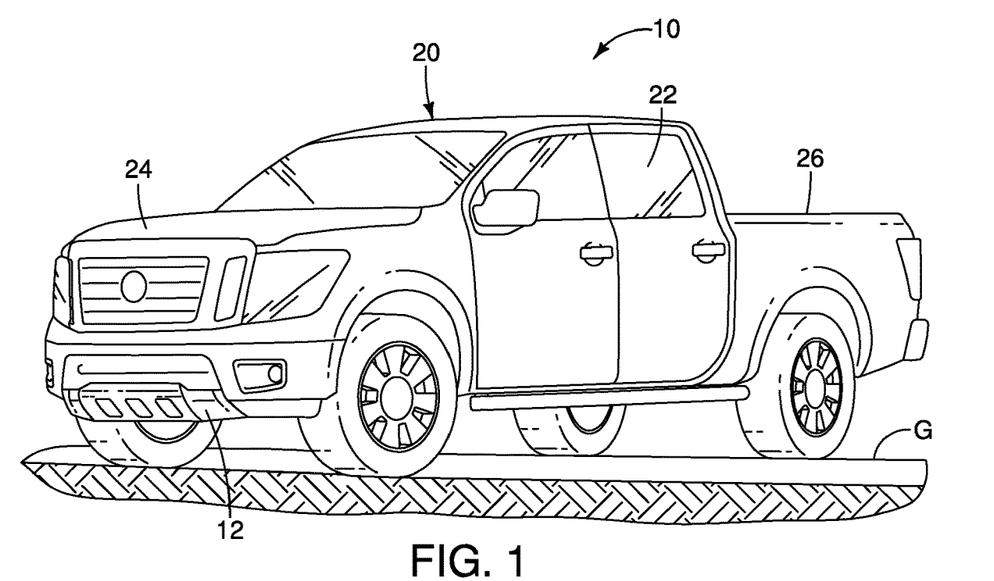
FIG. 1 is a perspective view of a vehicle that includes a skid panel in accordance with the first embodiment.

Referring initially to FIG. 1, a vehicle 10 that includes a skid panel 12 is illustrated in accordance with a first embodiment.

Figure 2:
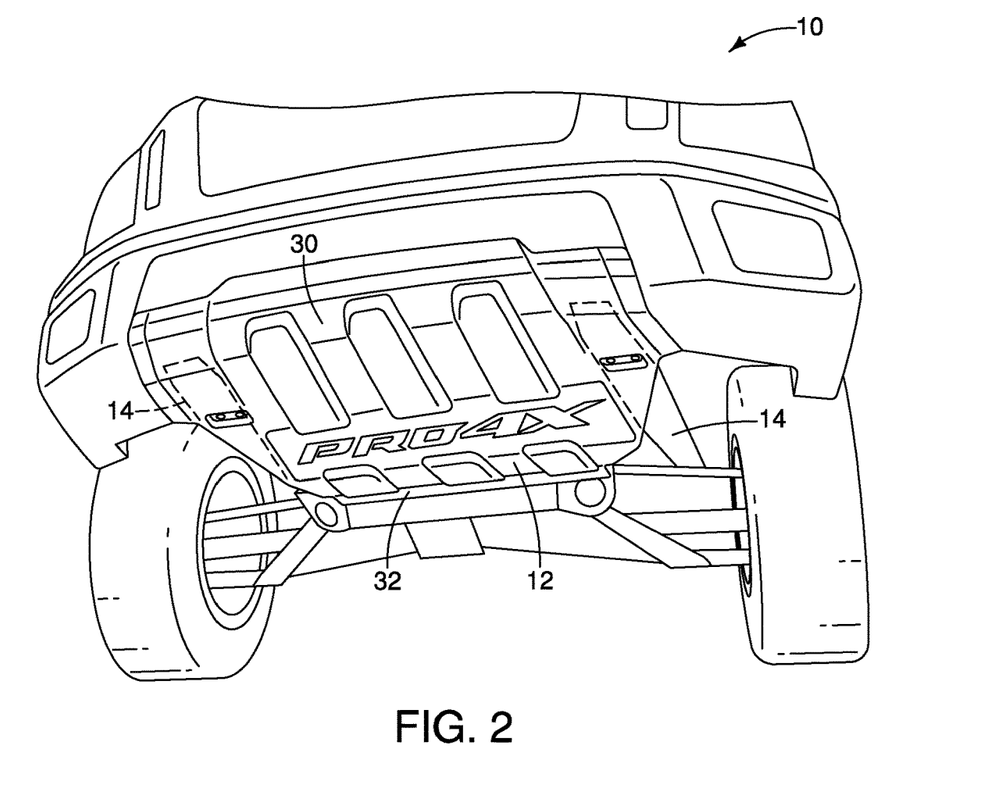
FIG. 2 is a perspective view of a forward area of an underside of the vehicle shown in FIG. 1, showing a lower surface of the skid panel in accordance with the first embodiment.
Figure 3:
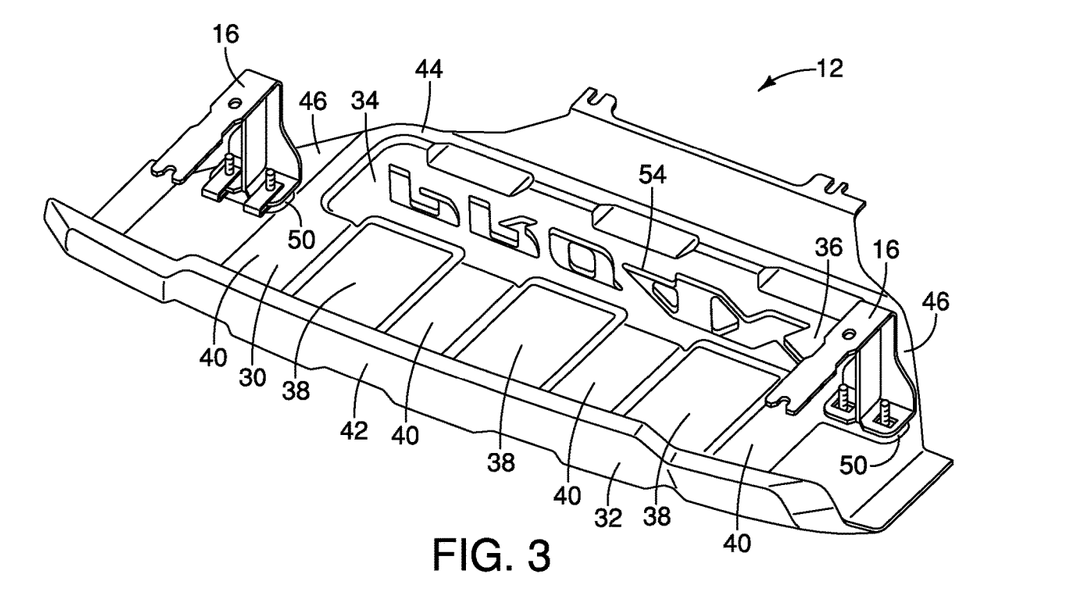
FIG. 3 is a perspective view of the skid panel removed from the vehicle showing an upper surface of the skid panel in accordance with the first embodiment.
Figure 4:
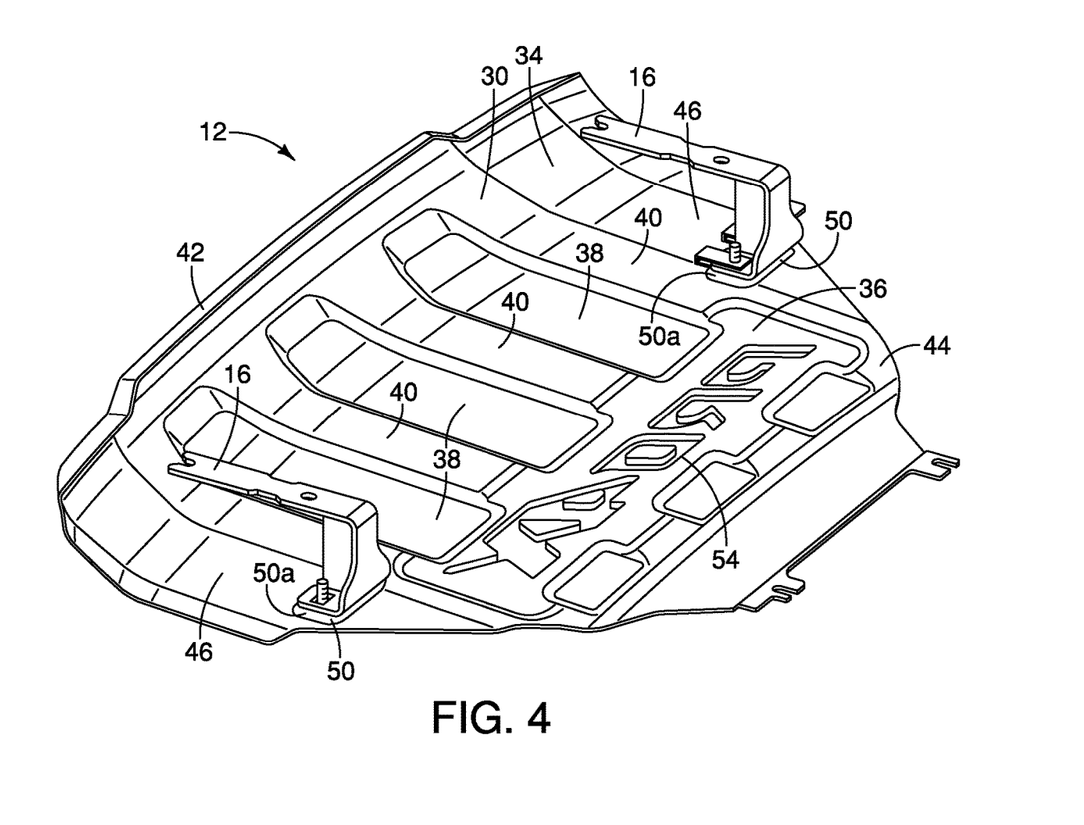
FIG. 4 is another perspective view of the skid panel removed from the vehicle showing the upper surface of the skid panel in accordance with the first embodiment.
Figure 5:
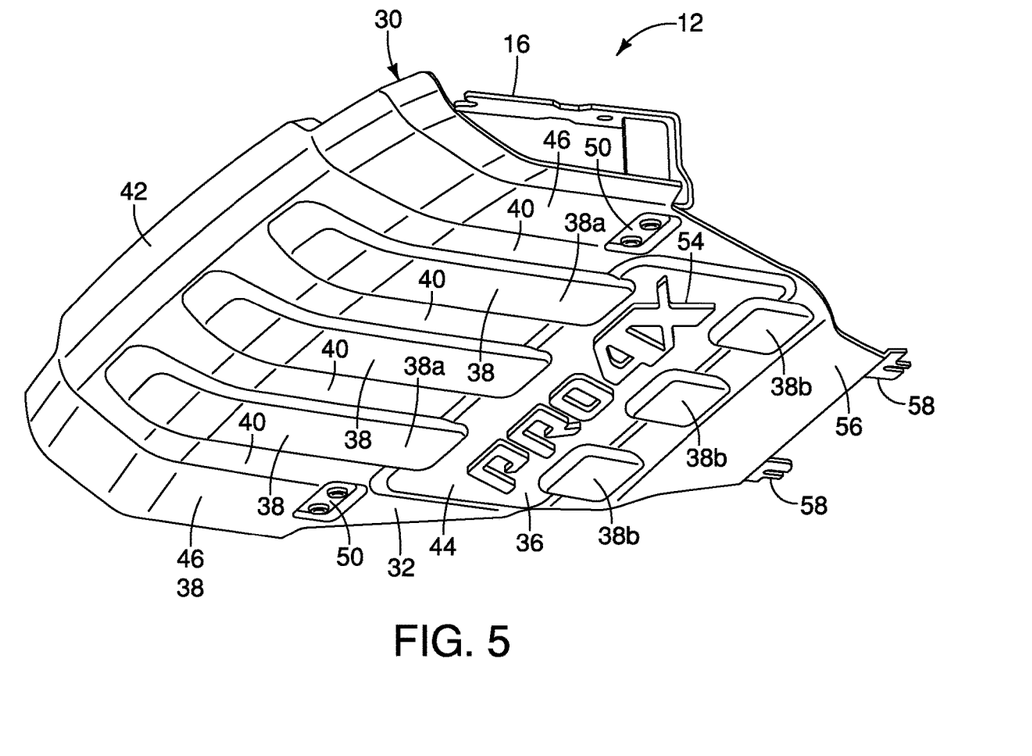
FIG. 5 is yet another perspective view of the skid panel removed from the vehicle showing the lower surface of the skid panel in accordance with the first embodiment.

The vehicle 10 includes a forward portion of a frame 14 shown in phantom lines in FIG. 2. The skid panel 12 is attached to the frame 14 by brackets 16 shown in FIGS. 3-6. The skid panel 12 is described further below after a brief description of the vehicle 10.

The vehicle 10 is depicted as a pickup truck but can be any of a variety of vehicle designs, such as an SUV (sports utility vehicle), an off-road vehicle, a van or any vehicle design that can receive a skid panel installed beneath an engine and/or beneath a vehicle engine compartment.

As shown in FIG. 1, the vehicle 10 includes a vehicle body structure 20 that defines a passenger compartment 22, an engine compartment 24 and a cargo area 26. Since such vehicle body structures are conventional vehicle features, further description is omitted for the sake of brevity.

The skid panel 12 is preferably a single, unitary, monolithic element that is basically a panel with various contours that accomplish at least two objectives. First, the contours of the skid panel 12 provide the skid panel 12 with an attractive appearance, and, second, the contours of the skid panel 12 enhance the strength of the skid panel 12 such that the skid panel 12 is more rigid than a flat, planar panel. Specifically, each of the portions of the skid panel 12 described below provides the skid panel 12 with greater rigidity and overall strength to resist deformation or bending.

The skid panel 12 is installed to an underside of the vehicle 12 and protects elements and systems within the engine compartment 22 against possible debris, such as gravel, mud, sand, rocks or other objects that can become airborne and move under the vehicle 10 while the vehicle 10 is operating and undergoing forward motion.

As shown in FIGS. 1-6, the skid panel 12 has a main body 30 that is configured for installation to a forward area of an underside of the vehicle 10. The main body 30 has a lower surface 32 and an upper surface 34. The main body 30, as is visible from the lower surface 32 shown in FIGS. 5-15, includes a flat area 36, a plurality of first offset areas 38 and a plurality of second offset areas 40. The main body 30 further defines a forward section 42 and a rearward section 44. The main body 30 further includes outboard sections 46, described further below. It should be understood from the drawings that in the description below, the differing vertical heights of the various portions of the lower surface 32 are relative to level ground G (FIG. 1) beneath the vehicle 10 with the skid panel 12 installed to an underside of the vehicle 10, and the lower surface 32 facing in a downward direction. The flat area 36 is located along the rearward section 44.

Figure 6:
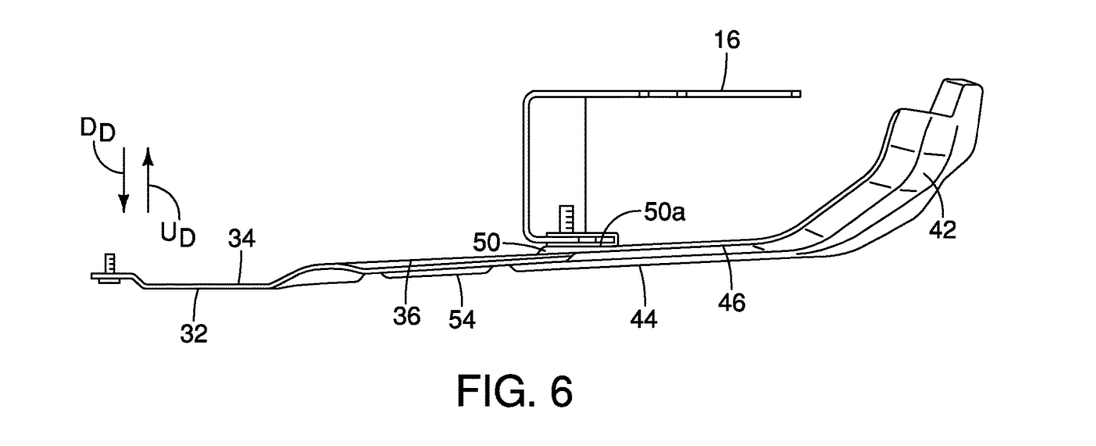
FIG. 6 is a side view of the skid panel removed from the vehicle in accordance with the first embodiment.

The main body 30 also includes a forward pair of attachment areas 50 located substantially within corresponding ones of the outboard sections 46. Upper surfaces 50a of each of the forward pair of attachment areas 50 are located vertically higher that the outboard sections 46 the main body 50, as shown in FIG. 6. FIG. 6 also shows arrows indicating an upward direction $U_D$ and a downward direction DD.

As shown along the lower surface 32 in FIGS. 5 and 7-15, the flat area 36 of the lower surface 32 has an overall rectangular shape and is surrounded by predetermined ones of the plurality of first offset areas 38 and the plurality of second offset areas 40. The flat area 36 of the lower surface 32 includes embossed alpha-numeric shapes 54 that are vertically lower the flat area 36. In other words, the alpha-numeric shapes 54 extend downward closer to the ground G than the flat area 36. The flat area 46 is centered between the outboard sections 46 but is located closer to the rearward section 44 of the skid panel 12 than the forward section 44.

Figure 7:
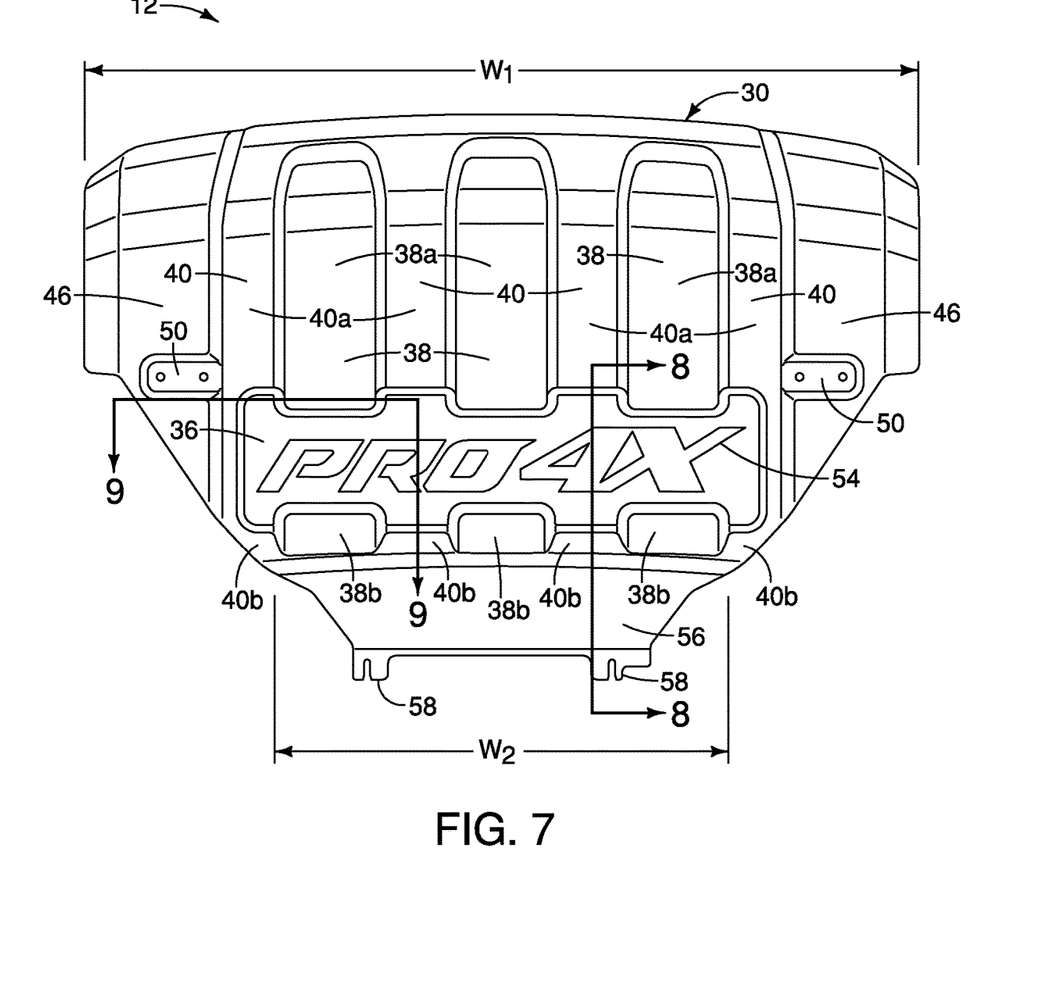
FIG. 7 is a plan view of the lower surface of a main body of the skid panel showing a flat area, a plurality of first offset areas, a plurality of second offset areas and alpha numeric shapes within the flat area in accordance with the first embodiment.
Figure 8:
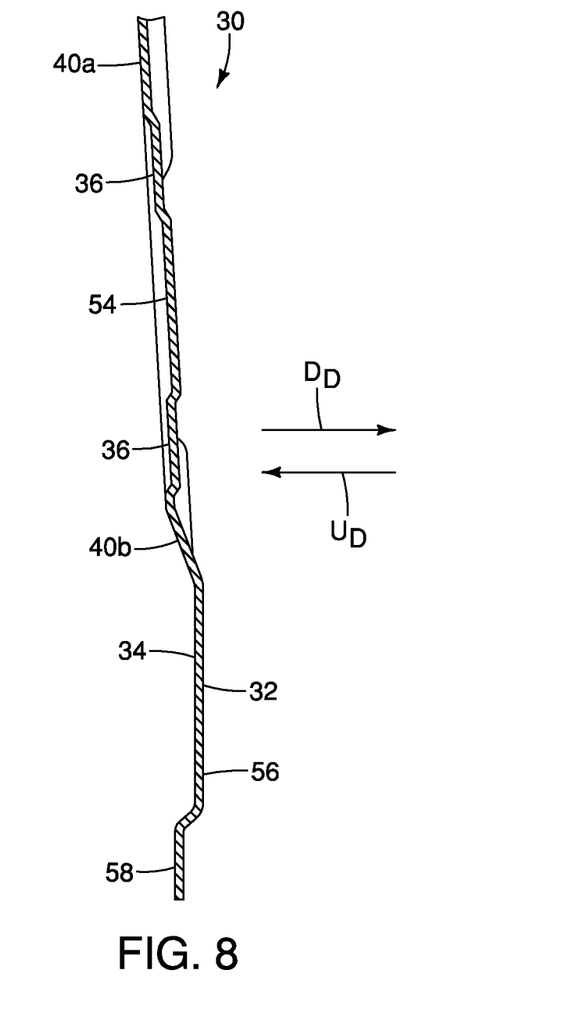
FIG. 8 is a cross-sectional view of a portion of the skid panel taken along the line 8-8 in FIG. 7 showing differences in vertical height of the flat area, the plurality of first offset areas and the plurality of second offset areas in accordance with the first embodiment.
Figure 9:
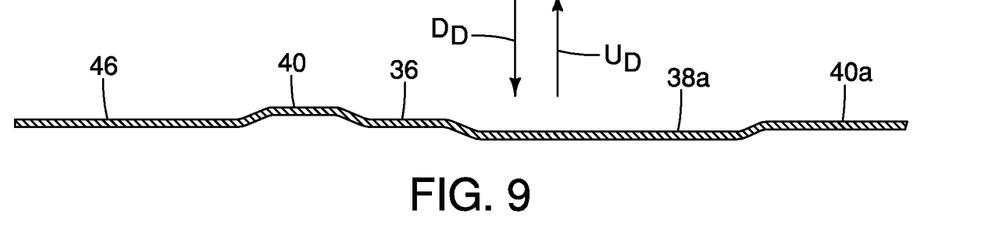
FIG. 9 is another cross-sectional view of a portion of the skid panel taken along the line 9-9 in FIG. 7 showing differences in vertical height of the flat area, the alpha numeric shapes and the plurality of second offset areas in accordance with the first embodiment.
Figure 10:
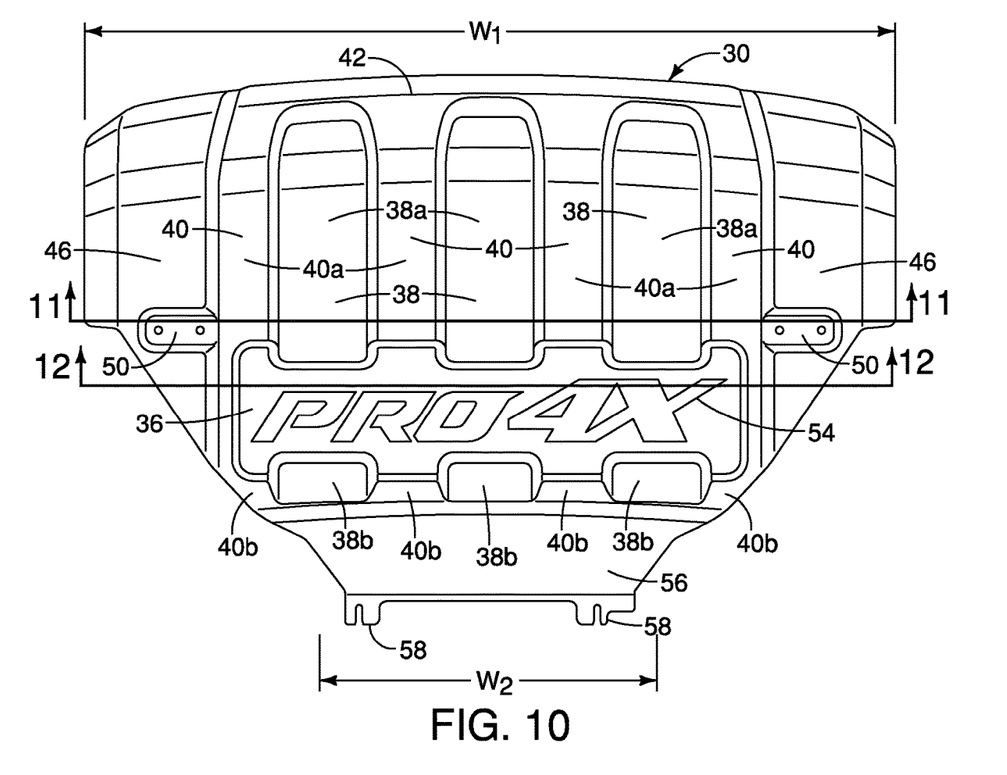
FIG. 10 is a plan view of the lower surface of a main body of the skid panel that is basically the same as FIG. 7, showing the flat area, the plurality of first offset areas, the plurality of second offset areas and the alpha numeric shapes within the flat area in accordance with the first embodiment.

As shown in FIG. 7, the plurality of first offset areas 38 are vertically offset from the flat area 36 such that along the rearward section 44 of the main body 30, respective lower surfaces of the plurality of first offset areas 38 are vertically lower than the flat area 36, within the rearward section 44. The first offset areas 38 further curve upward as they extend along the forward section 42. The plurality of first offset areas 38 further extend parallel to one another from the flat area to the forward section 42. The portions of the first offset areas 38 forward from the flat area 36 are referred to herein below as first sections 38a of the first offset areas 38. The plurality of first offset areas 38 further include second sections 38b that extend parallel to one another rearward from the flat area 36 in alignment with corresponding ones of the first sections 38.

As is also shown in FIG. 7, the plurality of second offset areas 40 include third sections 40a and fourth sections 40b. The third sections 40a extend parallel to one another and are alternatingly located between the first sections 38a along the rearward section 42 extending from the flat area 36 to the forward section 44. The fourth sections 40b are parallel to one another and are located alternatingly between the second sections 38b extending rearward from the flat area 36.

The forward section 42 curves upward in a direction extending forward from the rearward section 44 with the plurality of first offset areas 38 and the plurality of second offset areas 40 extending partway along the forward section 42.

As shown in FIG. 7, the forward section 42 has a first overall width $W_1$ and the rearward section 44 has tapering edges that taper toward one another such that a rearward end 56 of the rearward section 44 has an overall width W2 that is smaller than the first overall width $W_1$. The rearward end 56 of the rearward section 44 includes a rearward pair of attachment areas 58 that are spaced apart from one another. The rearward pair of attachment areas 58 are located along the rearward end 56 of the rearward section 44 and include projections configured to receive mechanical fasteners (not shown) for attachment to, for example, a cross-member (not shown) of the frame 14 of the vehicle 10.

Figure 11:
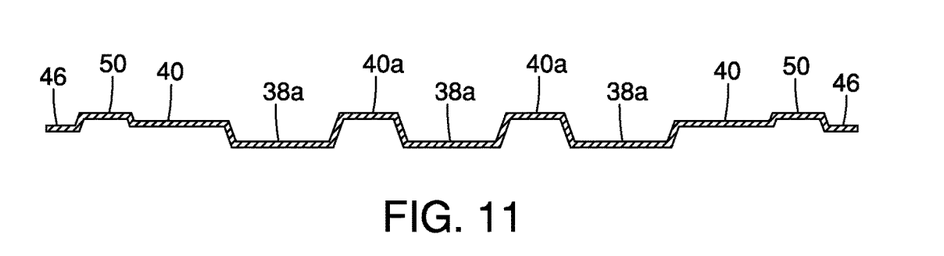
FIG. 11 is a cross-sectional view of a portion of the skid panel taken along the line 11-11 in FIG. 10 showing differences in vertical height of the flat area, the plurality of first offset areas and the plurality of second offset areas in accordance with the first embodiment.
Figure 12:
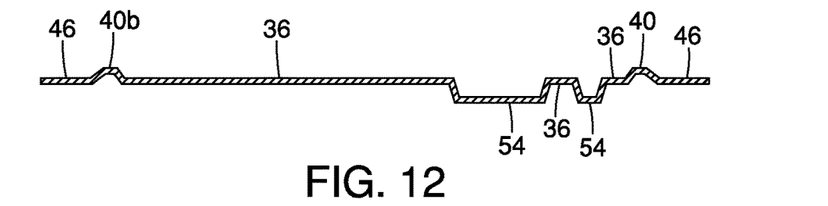
FIG. 12 is another cross-sectional view of a portion of the skid panel taken along the line 12-12 in FIG. 10 showing differences in vertical height of the flat area, the alpha numeric shapes and the plurality of second offset areas in accordance with the first embodiment.
Figure 13:
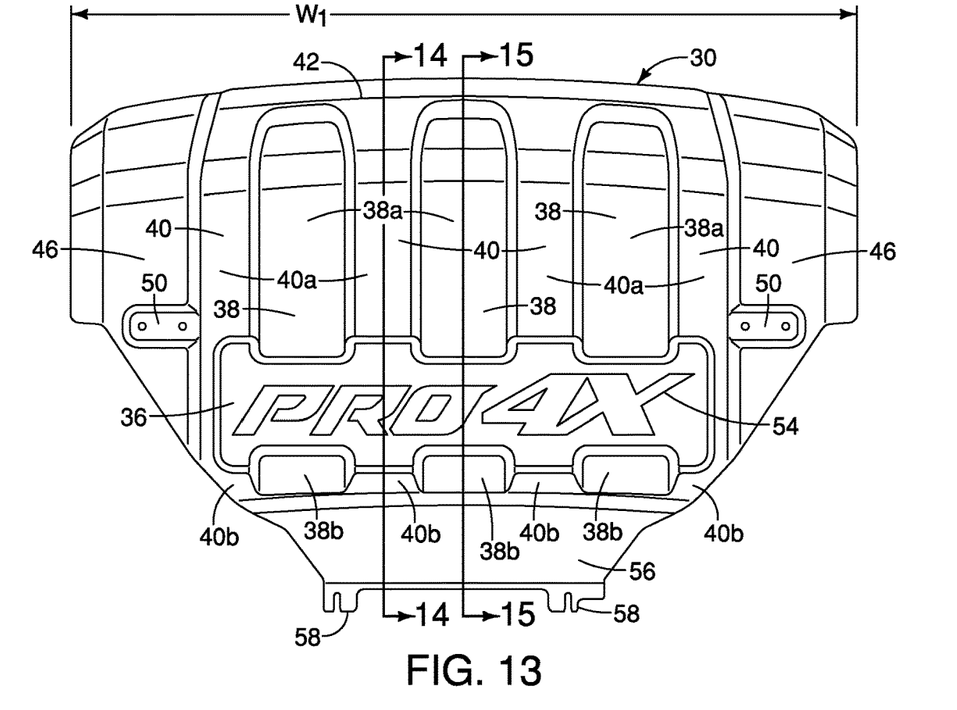
FIG. 13 is a plan view of the lower surface of a main body of the skid panel that is basically the same as FIGS. 7 and 10, showing the flat area, the plurality of first offset areas, the plurality of second offset areas and the alpha numeric shapes within the flat area in accordance with the first embodiment.

The outboard sections 46 of the main body 30 extend parallel to the first sections 38a and the third sections 40a and are located along respective outboard sides of the main body 30 adjacent to respective ones of the third sections 40a. As shown in FIG. 11, the outboards sections 46 can be located vertically higher than the adjacent ones of the third sections 40a or can be level with the third sections 40a.

Figure 14:
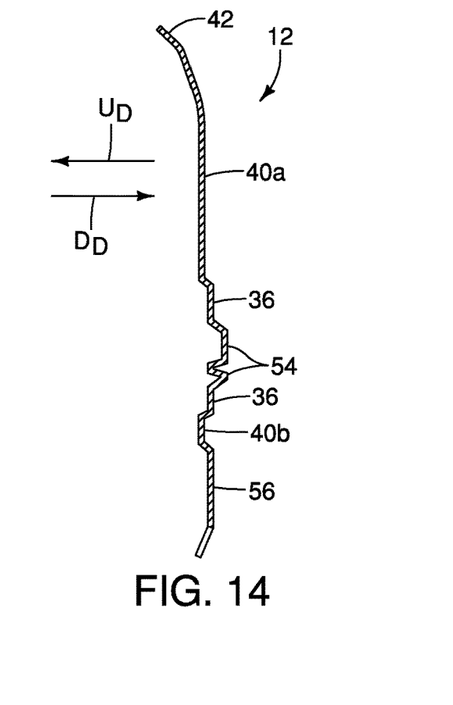
FIG. 14 is a cross-sectional view of a portion of the skid panel taken along the line 14-14 in FIG. 13 showing differences in vertical height of the flat area, the alpha numeric shapes and the plurality of second offset areas in accordance with the first embodiment.
Figure 15:
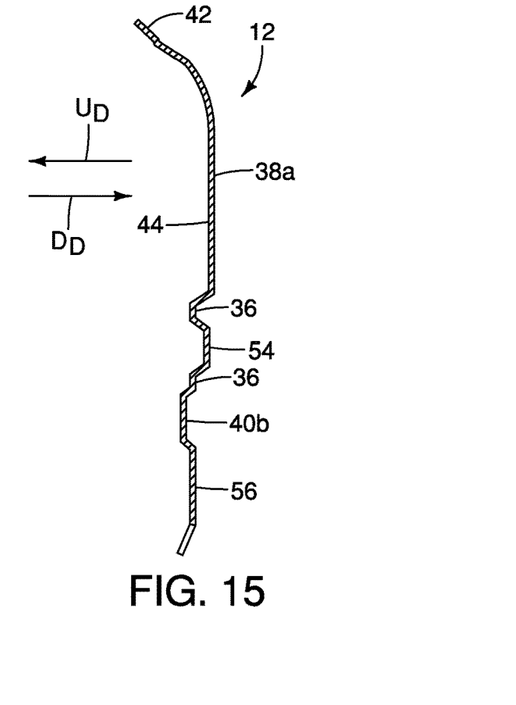
FIG. 15 is another cross-sectional view of a portion of the skid panel taken along the line 15-15 in FIG. 13 showing differences in vertical height of the flat area, the alpha numeric shapes and the plurality of first offset areas in accordance with the first embodiment.

As shown in FIGS. 6, 8, 9, 11, 12, 14 and 15, the relative vertical locations of various sections, areas and surfaces of the main body are shown. Specifically, as shown in FIG. 6, along the rearward section 44 of the main body 30, the upper surfaces 50a of the forward attachment areas 50 are vertically higher than the flat area 36, the plurality of first offset areas 38 and the second offset areas 40. The plurality of first offset areas 38 are vertically lower than the flat area 36. The second offset areas 40 are vertically higher than both the first offset areas 38 and the flat area 36. As shown in FIGS. 14 and 15, the alpha-numeric shapes 54 are vertically at the same level as the first offset areas 38, but alternatively can extend vertically lower than the first offset areas 38, if desired.

The plurality of first offset areas 38, the flat area 36 along with the alpha-numeric shapes 54 and the second offset areas 40 all provide a stiffening effect to the skid panel 12. These various surface contours provide the main body 30 of the skid panel 12 with a greater resistance to bending and deformation, as well as providing the skid panel 12 with an attractive appearance Second Embodiment Referring now to FIG. 16, a skid panel 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 16:
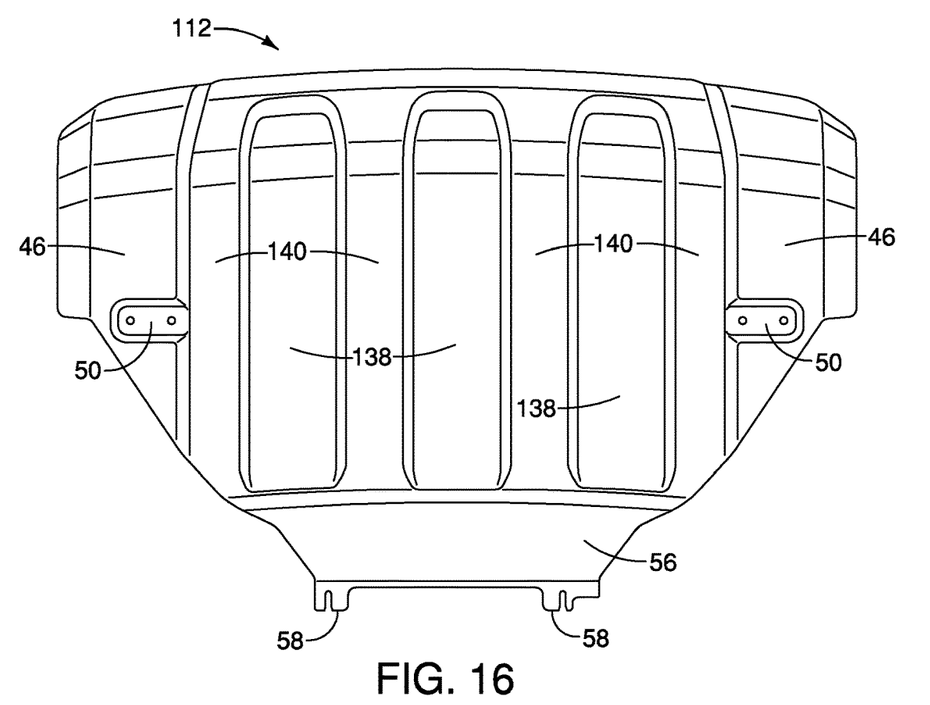
FIG. 16 is a plan view of a lower surface of a main body of a skid panel in accordance with a second embodiment.

The skid panel 112 includes first offset areas 138 and second offset areas 140. The first offset areas 138 are similar to the first offset areas 38 of the first embodiment and are positioned in an alternating arrangement between the second offset areas 140. As with the vertical height differences between the first offset areas 38 and the second offset areas 40 of the first embodiment, the first offset areas 138 are located at a vertical height that differs from the vertical height of the second offset areas 140.

The skid panel 112 also includes the lateral outboard sections 46, the forward pair of attachment areas 50, the rear end 56 and attachment areas 58, as described above with respect to the first embodiment.

Third Embodiment

Figure 17:
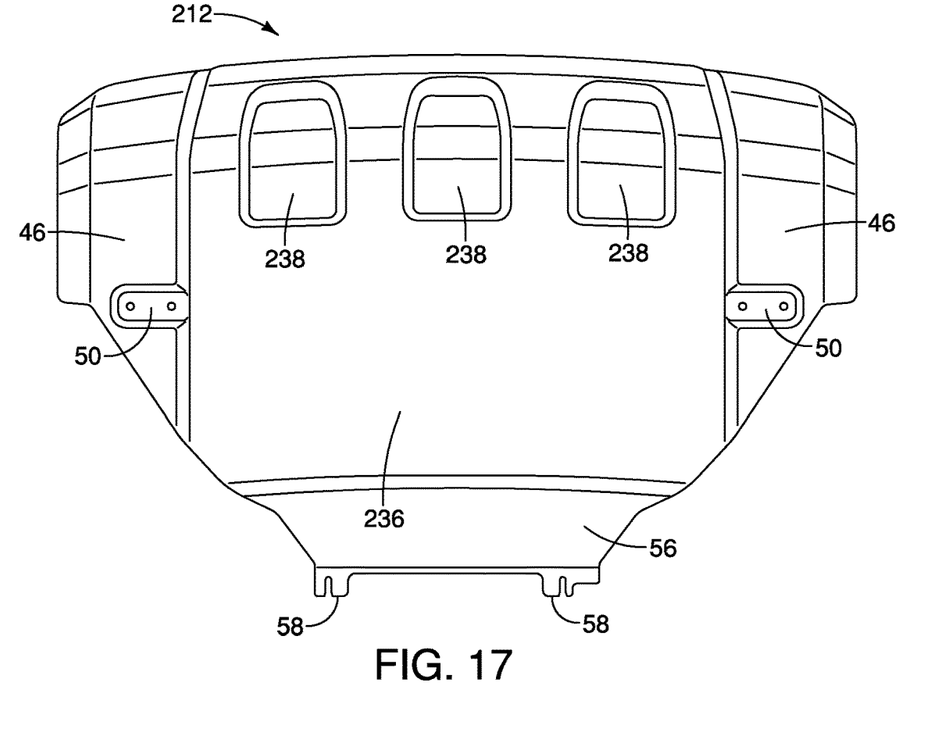
FIG. 17 is a plan view of a lower surface of a main body of a skid panel in accordance with a third embodiment.

Referring now to FIG. 17 a skid panel 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The skid panel 212 includes first offset areas 238 and a flat area 236. The first offset areas 238 are similar to the first offset areas 38 of the first embodiment and are positioned in an alternating arrangement between the portions of the flat area 236. As with the vertical height differences between the first offset areas 38 and the flat area 36 of the first embodiment, the first offset areas 238 are located at a vertical height that differs from the vertical height of the flat area 236.

The skid panel 212 also includes the lateral outboard sections 46, the forward pair of attachment areas 50, the rear end 56 and attachment areas 58, as described above with respect to the first embodiment.

Fourth Embodiment

Figure 18:
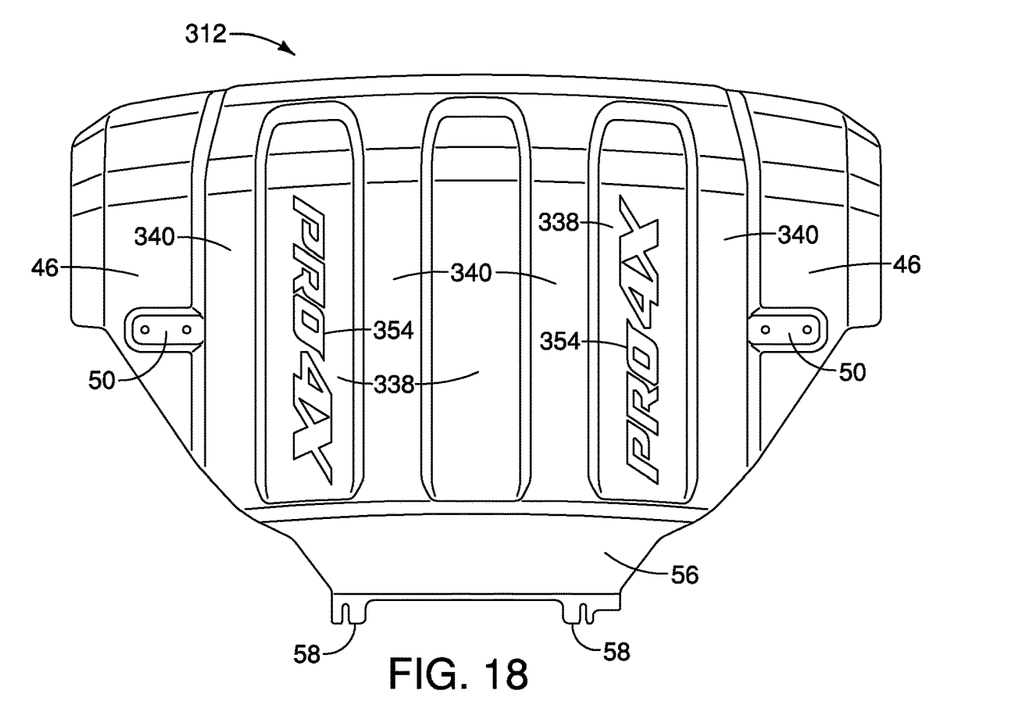
FIG. 18 is a plan view of a lower surface of a main body of a skid panel in accordance with a fourth embodiment.

Referring now to FIG. 18, a skid panel 312 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The skid panel 312 includes first offset areas 338, second offset areas 340 and alpha numeric shapes 354. The first offset areas 338 are similar to the first offset areas 38 of the first embodiment and are positioned in an alternating arrangement between the second offset areas 340. As with the vertical height differences between the first offset areas 38 and the second offset areas 40 of the first embodiment, the first offset areas 338 are located at a vertical height that differs from the vertical height of the second offset areas 340. In the fourth embodiment, two of the first offset areas 338 include the alpha numeric shapes 354. The alpha numeric shapes 354 of the first offset areas 338 differs from the vertical height of both the first offset areas 338 and the second offset areas 340.

The skid panel 312 also includes the lateral outboard sections 46, the forward pair of attachment areas 50, the rear end 56 and attachment areas 58, as described above with respect to the first embodiment.

Fifth Embodiment

Figure 19:
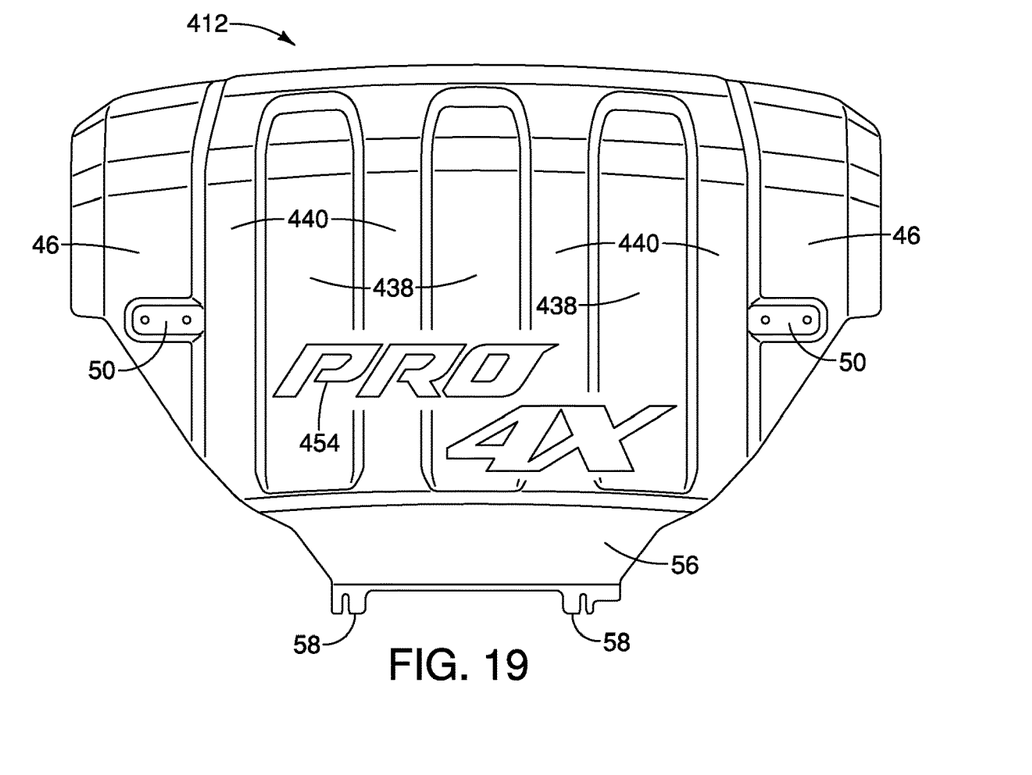
FIG. 19 is a plan view of a lower surface of a main body of a skid panel in accordance with a fifth embodiment.

Referring now to FIG. 19, a skid panel 412 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The skid panel 412 includes first offset areas 438, second offset areas 440 and alpha numeric shapes 454. The first offset areas 438 are similar to the first offset areas 38 of the first embodiment and are positioned in an alternating arrangement between the second offset areas 440. As with the vertical height differences between the first offset areas 38 and the second offset areas 40 of the first embodiment, the first offset areas 438 are located at a vertical height that differs from the vertical height of the second offset areas 440. In the fifth embodiment, the alpha numeric shapes 454 are arranged such that they extend along all three of the first offset areas 438 and two of the second offset areas 440. The alpha numeric shapes 454 of the first offset areas 438 differs from the vertical height of both the first offset areas 438 and the second offset areas 440.

The skid panel 412 also includes the lateral outboard sections 46, the forward pair of attachment areas 50, the rear end 56 and attachment areas 58, as described above with respect to the first embodiment.

Sixth Embodiment

Figure 20:
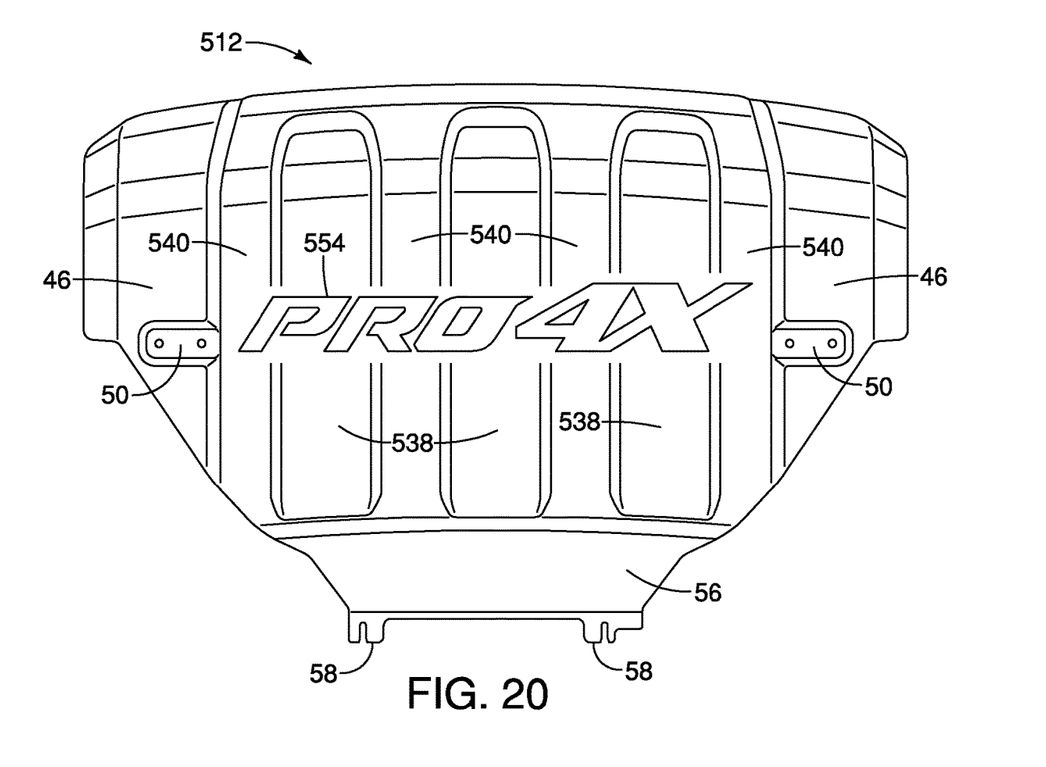
FIG. 20 is a plan view of a lower surface of a main body of a skid panel in accordance with a sixth embodiment.

Referring now to FIG. 20, a skid panel 512 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The skid panel 512 includes first offset areas 538, second offset areas 540 and alpha numeric shapes 554. The first offset areas 538 are similar to the first offset areas 38 of the first embodiment and are positioned in an alternating arrangement between the second offset areas 540. As with the vertical height differences between the first offset areas 38 and the second offset areas 40 of the first embodiment, the first offset areas 538 are located at a vertical height that differs from the vertical height of the second offset areas 540. In the sixth embodiment, the alpha numeric shapes 554 are arranged such that they extend along all three of the first offset areas 538 and all four of the second offset areas 540. The alpha numeric shapes 554 of the first offset areas 538 differs from the vertical height of both the first offset areas 538 and the second offset areas 540.

The skid panel 512 also includes the lateral outboard sections 46, the forward pair of attachment areas 50, the rear end 56 and attachment areas 58, as described above with respect to the first embodiment.

Seventh Embodiment

Figure 21:
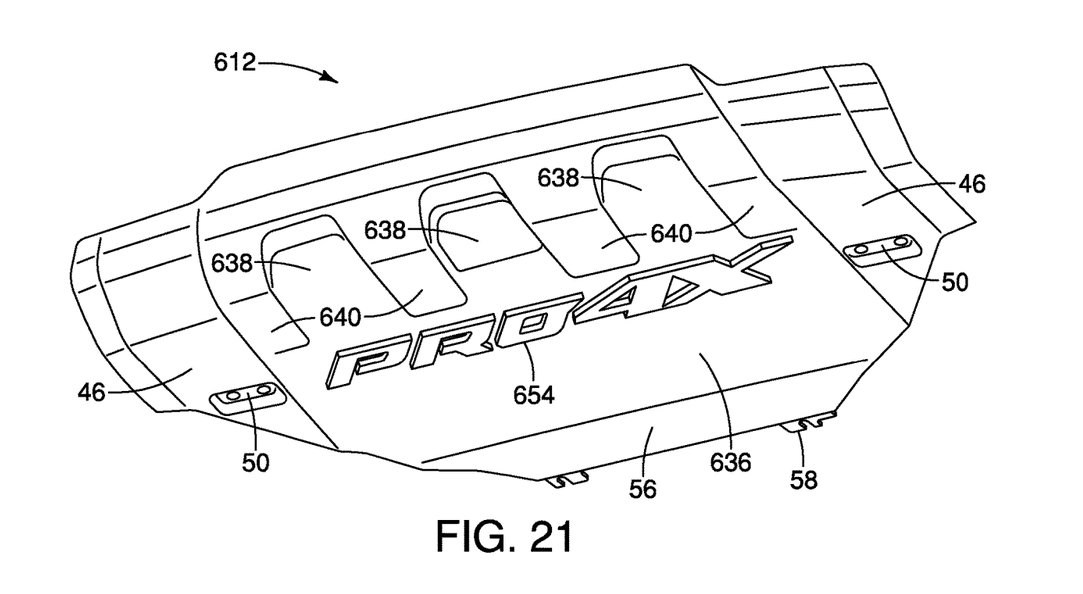
FIG. 21 is a perspective view of a lower surface of a main body of a skid panel in accordance with a seventh embodiment.
Figure 22:
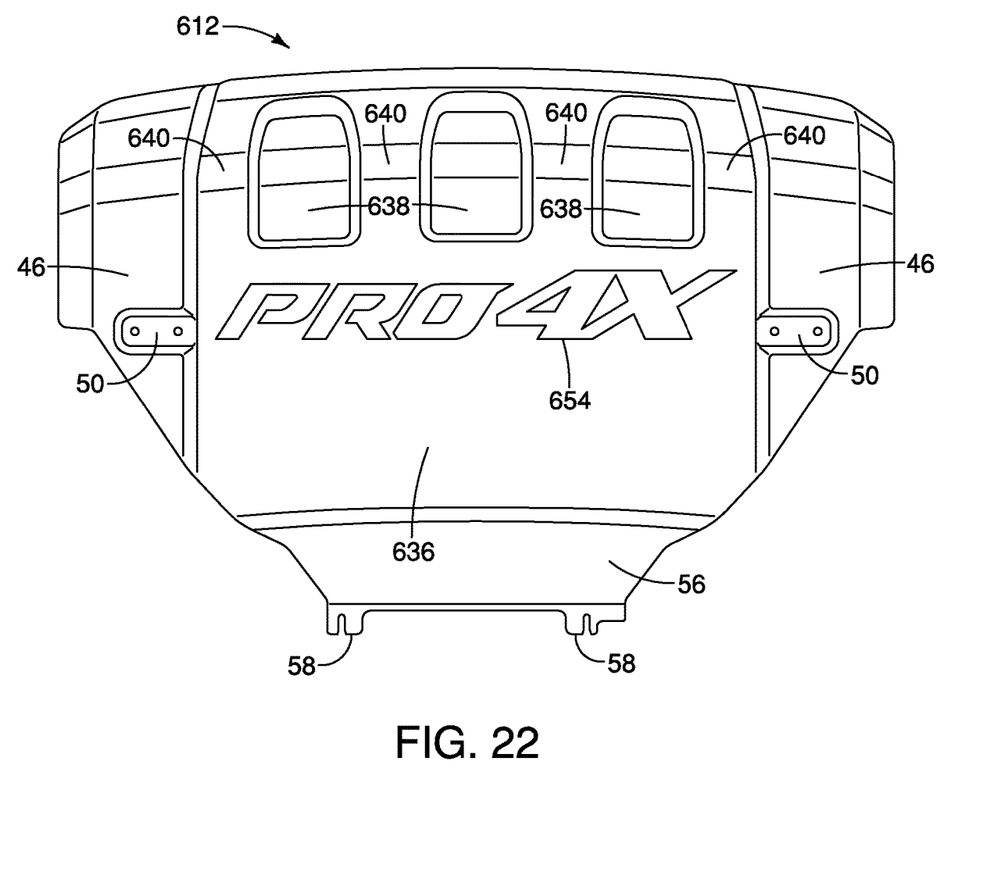
FIG. 22 is a plan view of a lower surface of a main body of a skid panel in accordance with the seventh embodiment.

Referring now to FIG. 21-22, a skid plate 612 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

The skid panel 612 includes first offset areas 638, second offset areas 640, a flat area 636 and alpha numeric shapes 654. The first offset areas 638 are similar to the first offset areas 38 of the first embodiment and are positioned in an alternating arrangement between the second offset areas 540. As with the vertical height differences between the first offset areas 38 and the second offset areas 40 of the first embodiment, the first offset areas 638 are located at a vertical height that differs from the vertical height of the second offset areas 640. In the seventh embodiment, the alpha numeric shapes 654 are arranged within the flat area 636. The alpha numeric shapes 654 of the first offset areas 538 differs from the vertical height of both the first offset areas 638, the second offset areas 640 and the flat area 636.

The skid panel 612 also includes the lateral outboard sections 46, the forward pair of attachment areas 50, the rear end 56 and attachment areas 58, as described above with respect to the first embodiment.

The features and structural components of the vehicle 10, other than the skid panels 12, 112, 212, 312, 412, 512 and 612, are conventional components that are well known in the art. Since such features and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle skid panel. Accordingly, these terms, as utilized to describe the present invention should be interpreted relative to a vehicle equipped with the vehicle skid panel.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle skid panel, comprising:
a main body configured for installation to a forward area of an underside of a vehicle, the main body having a lower surface and an upper surface, the lower surface including a flat area, a plurality of first offset areas and a plurality of second offset areas, the plurality of first offset areas being offset from the flat area such that the plurality of first offset areas have respective surfaces that are vertically lower than the flat area and the plurality of second offset areas are vertically higher than the flat area, the main body further defining a forward section and a rearward section, the rearward section including the flat area, and the forward section curving upward in a direction extending forward from the rearward section, the plurality of first offset areas including first sections that extend parallel to one another from the flat area to the forward section, and the plurality of first offset areas including second sections that extend parallel to one another rearward from the flat area and in alignment with corresponding ones of the first sections.

2. The vehicle skid panel according to claim 1, wherein the main body is formed as a single, unitary, monolithic element.

3. The vehicle skid panel according to claim 1, wherein the plurality of second offset areas includes third sections that extend parallel to one another alternatingly between the first sections from the flat area to the forward section.

4. The vehicle skid panel according to claim 3, wherein the plurality of second offset areas includes fourth sections that extend parallel to one another alternatingly between the third sections rearward from the flat area.

5. The vehicle skid panel according to claim 1, wherein the main body further includes outboard sections that extend parallel to the first sections and the second sections and are located along respective outboard sides of the main body adjacent to respective ones of the second sections.

6. The vehicle skid panel according to claim 5, wherein the outboards sections are located vertically higher than the adjacent ones of the second sections.

7. The vehicle skid panel according to claim 5, wherein the main body includes a forward pair of attachment areas located substantially within corresponding ones of the outboard sections, upper surfaces of each of the forward pair of attachment areas being located vertically higher that the outboard sections the main body.

8. The vehicle skid panel according to claim 1, wherein the forward section has a first overall width and the rearward section has tapering edges that taper toward one another such that a rearward end of the rearward section has an overall width that is smaller than the first overall width.

9. The vehicle skid panel according to claim 8, wherein the main body includes a rearward pair of attachment areas spaced apart from one another and located along the rearward end of the rearward section.

10. A vehicle skid panel comprising:
a main body configured for installation to a forward area of an underside of a vehicle, the main body having a lower surface and an upper surface, the lower surface including a flat area, a plurality of first offset areas and a plurality of second offset areas, the plurality of first offset areas being offset from the flat area such that the plurality of first offset areas have respective surfaces that are vertically lower than the flat area and the plurality of second offset areas are vertically higher than the flat area, the flat area of the lower surface having an overall rectangular shape and is surrounded by predetermined ones of the plurality of first offset areas and the plurality of second offset areas.

11. The vehicle skid panel according to claim 1, wherein the flat area of the lower surface includes embossed alpha-numeric shapes that are vertically lower the flat area.

12. A vehicle skid panel, comprising:
a main body configured for installation to a forward area of an underside of a vehicle, the main body having forward section, a rearward section and a lower surface, the lower surface including a flat area, a plurality of first offset areas and a plurality of second offset areas, the plurality of first offset areas including first sections that extend parallel to one another from the flat area to the forward section, the plurality of second offset areas including sections that extend parallel to one another alternatingly between the first sections from the flat area to the forward section, and the plurality of first offset areas including sections that extend parallel to one another rearward from the flat area and in alignment with corresponding ones of the first sections.

13. The vehicle skid panel according to claim 12, wherein the plurality of second offset areas includes sections that extend parallel to one another alternatingly between the sections of the plurality of first offset area located rearward from the flat area.

14. The vehicle skid panel according to claim 12, wherein the main body further includes outboard sections that extend parallel to the first sections, and, are located along respective outboard sides of the main body adjacent to respective outboard-most ones of the plurality of second offset areas, the outboards sections being located vertically higher than the adjacent ones of the outboard-most ones of the plurality of second offset areas.

15. The vehicle skid panel according to claim 14, wherein the main body includes a forward pair of attachment areas located substantially within corresponding ones of the outboard sections, upper surfaces of each of the forward pair of attachment areas being located vertically higher that the outboard sections the main body, the main body including a rearward pair of attachment areas spaced apart from one another and located along a rearward end of the rearward section.

16. The vehicle skid panel according to claim 15, wherein the forward section has a first overall width and the rearward section has tapering edges that taper toward one another such that a rearward end of the rearward section has an overall width that is smaller than the first overall width.

17. The vehicle skid panel according to claim 10, wherein the main body is formed as a single, unitary, monolithic element.

18. The vehicle skid panel according to claim 10, wherein the flat area of the lower surface includes embossed alpha-numeric shapes that are vertically lower the flat area.

19. The vehicle skid panel according to claim 12, wherein the flat area of the lower surface includes embossed alpha-numeric shapes that are vertically lower the flat area.

20. The vehicle skid panel according to claim 12, wherein the plurality of first offset areas are offset from the flat area such that the plurality of first offset areas have respective surfaces that are vertically lower than the flat area and the plurality of second offset areas being vertically higher than the flat area.

* * * * *